United States Patent [19]

Tunison, III

[11] 4,292,290

[45] Sep. 29, 1981

[54] PROCESS FOR THE PRODUCTION OF FINELY-DIVIDED METAL AND METALLOID OXIDES

[75] Inventor: Donald E. Tunison, III, Savoy, Ill.

[73] Assignee: Cabot Corporation, Boston, Mass.

[21] Appl. No.: 140,856

[22] Filed: Apr. 16, 1980

[51] Int. Cl.³ .................. C01B 33/18; C01B 13/14
[52] U.S. Cl. .................................. 423/336; 423/592;
 423/608; 423/611; 423/612; 423/617; 423/622;
 423/625; 106/288 B; 106/300; 422/156;
 422/158; 252/455 R; 252/463
[58] Field of Search ............... 423/336, 592, 608, 611,
 423/612, 617, 622, 625; 422/156, 158

[56] References Cited

U.S. PATENT DOCUMENTS

| | | | |
|---|---|---|---|
| 2,823,982 | 2/1958 | Saladin et al. | 423/625 |
| 2,990,249 | 6/1961 | Wagner | 423/336 |
| 3,130,008 | 4/1964 | Stokes et al. | 423/625 |
| 3,235,332 | 2/1966 | Woodhall | 423/625 |
| 3,954,945 | 5/1976 | Lange et al. | 423/336 |
| 4,036,938 | 7/1977 | Reed | 423/336 |
| 4,048,290 | 9/1977 | Lee | 423/336 |
| 4,108,964 | 8/1978 | Kratel et al. | 423/336 |

Primary Examiner—Herbert T. Carter
Attorney, Agent, or Firm—J. Schuman; R. F. Dropkin; B. R. Blaker

[57] ABSTRACT

There is disclosed an improved process and apparatus for the production of finely-divided metal and metalloid oxides by flame hydrolysis of corresponding metal and metalloid halides whereby fouling of burner apparatus is substantially completely avoided.

13 Claims, 3 Drawing Figures

PROCESS FOR THE PRODUCTION OF FINELY-DIVIDED METAL AND METALLOID OXIDES

The present invention relates generally to the production of finely-divided metal and metalloid oxides by high temperature decomposition of corresponding metal or metalloid feedstocks and is more particularly concerned with the production of finely-divided metal or metalloid oxides by flame hydrolysis of corresponding metal or metalloid halide feedstocks in the vapor phase.

Flame hydrolysis of vaporized metal or metalloid halide feedstocks to produce corresponding finely-divided oxide products is, broadly, a well-known and extensively practiced art. In such processes, a vaporized or gaseous hydrolyzable metal or metalloid halide feedstock is co-mingled with a flame formed by combustion of a water-producing, hydrogen-containing fuel and an oxygen-containing gas. The principal roles of the combustion flame are to provide water for hydrolysis of the halide feedstock, to provide sufficient auxiliary heat to support the normally endothermic nature of the hydrolysis reaction and to promote the particular thermal environment necessary to produce the desired oxide product. The resulting reaction products, comprising finely-divided particulate oxide entrained in reaction off-gases, are subjected to conventional cooling and solid product separation techniques, the separated off-gases, including hydrogen halide, thereafter being recycled and/or treated so as to recover valuable components therefrom and/or suitably disposed.

The finely-divided metal or metalloid oxide products producible by flame hydrolysis of corresponding metal or metalloid halide feedstocks find utility in various applications. For instance, finely-divided titania, vanadia and zirconia are useful as fillers and pigments in diverse polymers and elastomers and as catalysts and catalyst supports. Finely-divided alumina is useful as a filler for various matrices and finds additional utility as an anti-static and anti-soil agent when applied to textiles and as a frictionizing or anti-slip agent when applied to paper products or to textile fibers prior to spinning thereof. Coformed oxides produced by way of the flame hydrolysis process, such as silica/alumina or titania/alumina, also find utility in catalytic applications.

Finely-divided silicas presently represent a substantial portion of the metal or metalloid oxides commercially produced by flame hydrolysis techniques. These silicas are characterized by their relatively high purity, amorphous structure, small particle size and tendency to form loosely held gel-forming networks when dispersed in various liquids. The flame hydrolysis silicas are used, inter alia, as reinforcing fillers in elastomers, particularly silicone elastomers; as rheology control and thickening agents in organic and inorganic liquids; as flow and sag control agents in caulk, sealant and adhesive compositions; as anti-blocking agents for plastics, rubbers and adhesive coatings; and as free flow agents in various powdered products.

One of the problems faced by manufacturers of flame hydrolysis metal and metalloid oxides resides in the tendency of presently practiced processes to deposit hydrosolid oxide product on the discharge end or mouth of the burner through which the hydrolysis reactant mixture is introduced into the flame hydrolysis reaction zone. This deposition phenomenon is known variously as "whiskering", "bearding" or, simply, "burning fouling". Such burner fouling can be detrimental since, if sufficiently extensive, it can adversely affect the geometry and smoothness of the hydrolysis flame and thereby lessen the facility by which the process is carried out and can render the finely-divided metal or metalloid oxide product non-uniform. Thus, substantial efforts which have heretofore generally been met by only limited success have been made to minimize burner fouling or at least to limit the extent to which it occurs. For instance, burner fouling can generally be periodically mechanically removed from the burner mouth prior to deleterious build-up thereof. Preferably, however, the burner and the process stream(s) are designed so as to minimize the rate at which such fouling occurs. As an example of this latter, for instance, reference is made to U.S. Pat. No. 2,990,249, Wagner, June 27, 1961, wherein there is disclosed a technique by which burner fouling is minimized. Said technique broadly comprises the introduction of a purge gas stream adjacent the mouth of the burner and at about the point of discharge of the hydrolysis reactant mixture stream therefrom. This is accomplished by charging the purse gas, which may be air, through an annular slit which completely surrounds the burner mouth. The technique is said to mitigate against burner fouling by serving to mechanically impede the formation of solid reaction products at the burner mouth and by localized dilution of the hydrolysis reactants such that the rate of ignition of the reactant stream is depressed to the point that the oxide-producing hydrolysis reaction initiates only at some point physically removed from the burner mouth. In short, the technique disclosed by Wagner is intended to prevent anchoring of the oxide-producing hydrolysis flame directly on the burner mouth. In a subsequent disclosure, referring now to U.S. Pat. No. 3,954,945, Lange et al, May 4, 1976, hydrogen is disclosed as a suitable purge gas for use in the general technique originated by Wagner. The anti-fouling method disclosed in the Wagner patent mentioned above is not normally performed without difficulty since the projection of the purge gas into the reactant mixture stream at the burner mouth tends to result in unstable operations of the hydrolysis flame. This is believed to occur because the purge gas, when injected through the annular slit at a rate sufficient to beneficially affect the fouling problem, can also physically disturb the boundary of the hydrolysis reactant gas stream emanating from the burner mouth. In addition, the technique of the Wagner patent does not provide a stable site for propagation of the hydrolysis flame. Accordingly, burner operations employing the anti-fouling technique of Wagner are normally found to require rigid control of the flows through the burner to within relatively narrow limits in order to avoid flame-outs and flame sputtering and, even if due attention is paid to these parameters, the aforementioned instability problems may nevertheless arise.

In U.S. Pat. No. 4,048,290, K. B. Lee, Sept. 13, 1977, there is disclosed a substantial modification of the apparatus and method of Wagner. Replacing Wagner's annular slit is a sintered porous diffusion member surrounding each halide-containing reactant stream at the point(s) of discharge thereof from the burner. A hydrogen-containing purge gas or vapor is diffused or transpired through the porous diffusion members defining the boundaries of such halide-containing streams at flow rates sufficient to prevent fouling. It has been found that the apparatus and method of Lee does tend to result in lesser disturbance of the geometry of the reactant stream burner efflux than that resulting from the practice of the Wagner invention and that the resulting hydrolysis flame tends to be somewhat more stable. However, the method and apparatus of U.S. Pat. No. 4,048,290 are also possessed of certain disadvantages. For instance, the mass flow rate of the hydrogen-containing purge gas required to maintain clean burner conditions is usually quite substantial and can represent a substantial deficiency in terms of process economics. Secondly, in part due to the substantial mass flow rates required of the purge gas, it is not normally possible to replace the hydrogen-containing gas of Lee with purge gases of lesser cost, such as air or recycle process off-gases since the latter tend to excessively dilute the periphery of the reactant mixture stream effluxing from the burner mouth.

In accordance with the present invention, the above problems and deficiencies of the prior art methods and apparatuses have been substantially overcome.

OBJECTS OF THE INVENTION

It is a principal object of the invention to provide a novel improved process for the production of finely-divided metal or metalloid oxides by vapor phase flame hydrolysis of corresponding metal or metalloid halide feedstocks.

It is another object of the invention to provide an improved process of the foregoing type whereby the problem of burner fouling can be substantially completely avoided.

It is another object of the invention to provide an improved process of the foregoing type wherein, in addition to the benefit of freedom from the problem of burner fouling, said process is additionally characterized by good stability of the hydrolysis flame.

It is another object of the invention to provide an improved process of the foregoing type wherein, for a given burner apparatus, the overall consumption of hydrogen-containing fuel gas for a given rate of production of a metal or metalloid oxide product of a given surface area is substantially reduced.

It is another object of the invention to provide an improved process of the foregoing type characterized by improved burner capacity.

It is another object of the invention to provide a novel fouling-free burner system for the production of finely-divided metal or metalloid oxides by vapor phase flame hydrolysis of corresponding metal or metalloid halide feedstocks.

Other objects of the invention will, in part, appear hereinafter and will, in part, be obvious.

SUMMARY OF THE INVENTION

In accordance with the present invention, the above and other objects and advantages are generally realized by performing a metal or metalloid oxide-producing flame hydrolysis reactant mixture within a burner means; continuously discharging the resulting reactant mixture as a stream projected from the mouth of said burner means; continuously discharging a purge gas at a fouling preventive rate along the boundary of said reactant mixture stream as it is discharged from the burner mouth; and, at a plane substantially normal to the axis of said projected reactant mixture stream and physically spaced downstream from the burner mouth, contacting substantially only the periphery of said reactant mixture stream with a plurality of continuous pilot flames arranged substantially tangentially thereabout.

The improved burner system of the invention comprises burner means adapted to continuously receive, mix and enclose vaporous or gaseous metal or metalloid oxide-producing flame hydrolysis reactants therein, said reactants including a metal or metalloid halide feedstock, a water-producing hydrogen-containing fuel and an oxygen-containing oxidant and to continuously discharge the resulting reactant mixture as a substantially linearly projected stream from the mouth thereof; means to continuously discharge a purge gas along the boundary of the discharging reactant mixture stream in the region of the mouth of the burner means; a plurality of pilot flame burner spuds arranged about the circumference of the reactant mixture stream each such spud being disposed so as to direct a continuous pilot flame therefrom into substantially tangential contact with the periphery of said reactant mixture stream at a common plane spaced downstream of the burner mouth; and means to continuously supply a fuel gas to each said pilot flame burner spud.

THE DRAWING

FIG. 1 forming part hereof is a schematic, diagrammatic, longitudinal section of a burner system representative of an embodiment of the invention.

DESCRIPTION OF PREFERRED EMBODIMENTS

Figure 1:
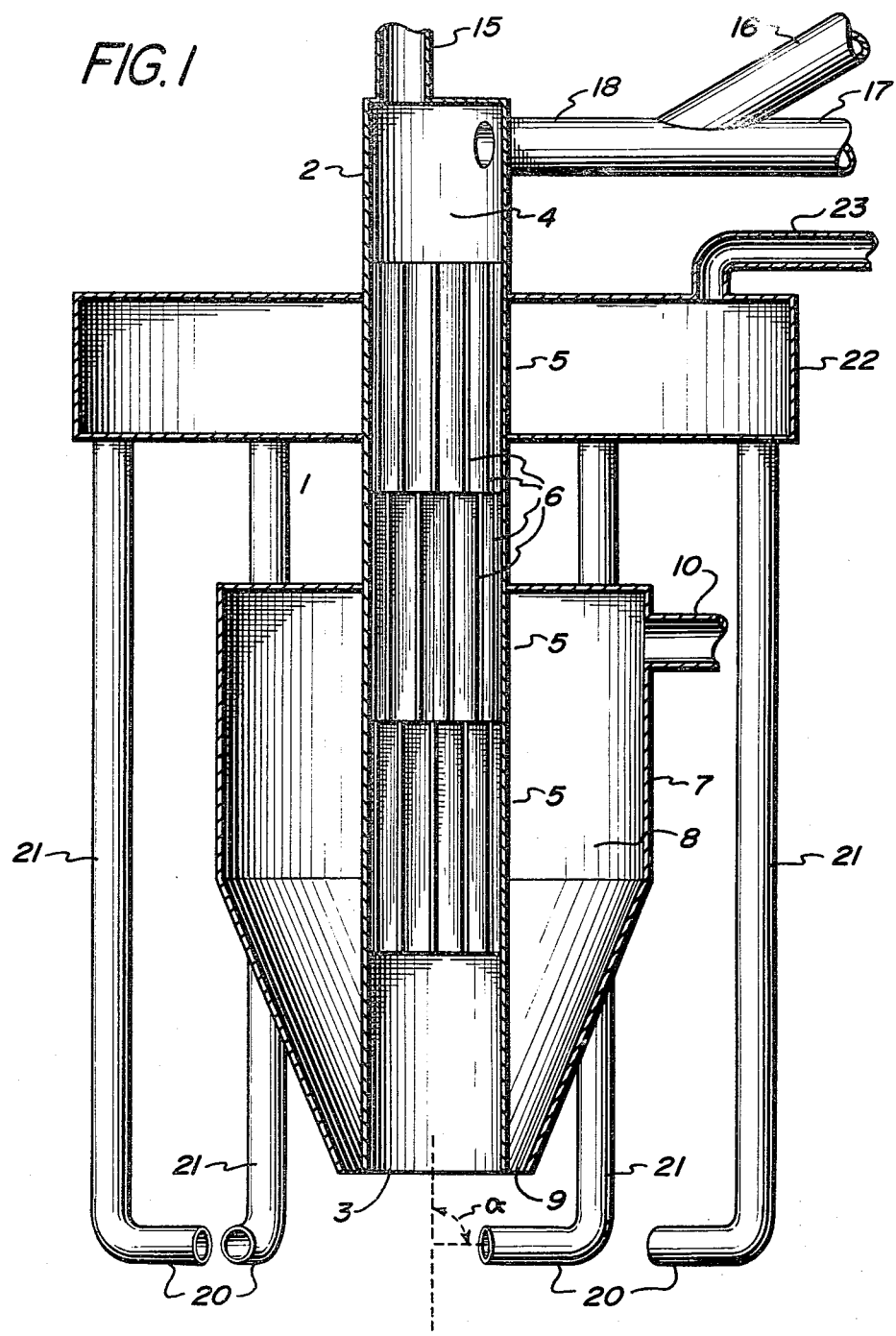

Metal or metalloid halide feedstocks useful in the practice of the invention include substantially any vaporizable or gaseous metal or metalloid halide capable of undergoing hydrolysis to the corresponding oxide under the conditions imposed thereon in the hydrolysis flame. Exemplary metal and metalloid halides are: vanadium tetrachloride, titanium tetrachloride, titanium tetrabromide, zirconium tetrachloride, aluminum trichloride, zinc chloride, antimony trichloride and the like. Included among suitable silicon halides are silicon tetrachloride, silicon tetrafluoride, methyltrichlorosilane, trichlorosilane, dimethyldichlorosilane, methyldichlorosilane, methyldichlorofluorosilane, dichlorosilane, dibutyldichlorosilane, ethyltrichlorosilane, propyltrichlorosilane and mixtures thereof. Where co-formed oxides of different metals or metalloids are desired it is, of course, apparent that the feedstock can comprise compatible mixtures of the corresponding metal or metalloid halides.

Substantially any vaporizable or gaseous water-producing hydrogen-containing fuel may be employed in the preparation of the hydrolysis reactant mixture, it being of importance that the selected fuel produce water as a by-product of its combustion with an oxygen-containing gas. Exemplary suitable fuels are hydrogen and the hydrocarbons such as methane, natural gas, refinery gas, ethane, propane, acetylene, butane, butylene, ethylene, pentane or propylene as well as normally liquid but vaporizable fuels such as aliphatic, aromatic, or alicyclic hydrocarbons. Generally, hydrogen will represent the preferred water-producing fuel since it burns cleanly without the formation of carbonaceous by-products.

Oxygen represents the oxidant for the combustion of the hydrogen-containing water-producing fuel in the process of the invention and may be employed in its pure state or admixed with other gases. Thus, oxygen, air, or oxygen-enriched air may be conveniently employed as the oxidant gas in the present process. However, if desired, it is also within the ambit of the invention to employ oxygen admixed with such gases as nitrogen, argon, helium, or carbon dioxide or hydrogen halide.

The hydrolysis reactant mixtures of interest will usually comprise an at least stoichiometric quantity of the hydrogen-containing fuel and, preferably, an at least stoichiometric quantity of the oxygen-containing oxidant gas. In other words, the hydrolysis reactant mixture performed within the burner and projected as a stream from the burner mouth will normally contain a sufficient concentration of hydrogen-containing fuel as to provide, upon combustion thereof, sufficient water to convert substantially all of the metal or metalloid halide vapor component to the corresponding oxide. Desirably, although not mandatorily, the concentration of oxygen-containing oxidant gas forming part of said mixture will be at least sufficient to burn all of the hydrogen-containing fuel component contained therein. Preferably, the concentrations of the hydrogen-containing fuel and oxygen-containing oxidant components contained in the reactant mixture will each be at least slightly in excess of the stoichiometric requirements described above therefor.

The purge gas or vapor discharged in the region of the burner mouth along the boundary of the reactant mixture stream can be substantially any gas or vapor which does not react deleteriously with the components of the hydrolysis reactant mixture or with the products of the hydrolysis reaction. In accordance with this broad requirement, therefore, it is apparent that the inert gases of Group O of the Mendeleev Periodic System, such as argon, neon, helium and xenon, are all generally suitable purge gases in the practice of the invention. So too, however, are other elemental and chemically combined gases such as nitrogen, carbon dioxide, and fuel or oxidant gases as hereinbefore described with respect to the reactants forming part of the reaction mixture stream. Where the atmosphere surrounding the discharged hydrolysis reactant mixture stream in the region of the burner mouth is air or recycled off-gases of the process, the preferred purge gas is air or hydrogen.

The rate at which the purge gas is discharged along the boundary of the hydrolysis reactant mixture stream as said stream is projected from the burner mouth is subject to considerable variation, the principal requirement being that said rate, at the minimum, be sufficient to prevent fouling of the burner mouth. Obviously, therefore, the minimum rate of purge gas flow necessary to achieve this result will be dependent upon such parameters as the particular composition of the hydrolysis reactant mixture stream, the velocity of said stream at the point of discharge thereof from the burner mouth, the design and size of the burner apparatus, the precise manner in which the purge gas is discharged along the boundary of the reactant mixture stream, the location and number of pilot flames positioned downstream of the burner mouth and the like. Suffice it to say, therefore, that said minimum rate of purge gas flow can normally be readily ascertained in the practice of the invention.

The continuous pilot flames of the invention are produced by the combustion of a fuel gas with a suitable oxidant therefor. Conveniently, but not necessarily, the fuel gas and the oxidant supplied to the pilot flames are of the same types as those employed in the performance of the reactant mixture stream. Where the region surrounding the pilot flames contains sufficient oxygen to stably support the burning of the pilot fuel gas or vapor, such as air, it is generally sufficient to supply fuel gas, alone, through the pilot flame burner spuds. Where, however, said region does not contain sufficient oxidant for the stable combustion of the pilot flames, such as when the atmosphere surrounding the reactant mixture stream is constituted entirely of recycled reaction off-gases, the pilot burner spuds should be supplied with a combustible mixture of a fuel gas and an oxidant. It is normally preferred to supply the pilot burner spuds with a combustible fuel/oxidant mixture, especially a hydrogen/air mixture, since this relieves the practitioner of the invention with need to consider the nature of the specific atmosphere surrounding the pilot flames while assuring that the pilot flames will burn smoothly and continuously without especial regard to that external atmosphere.

Figure 2:
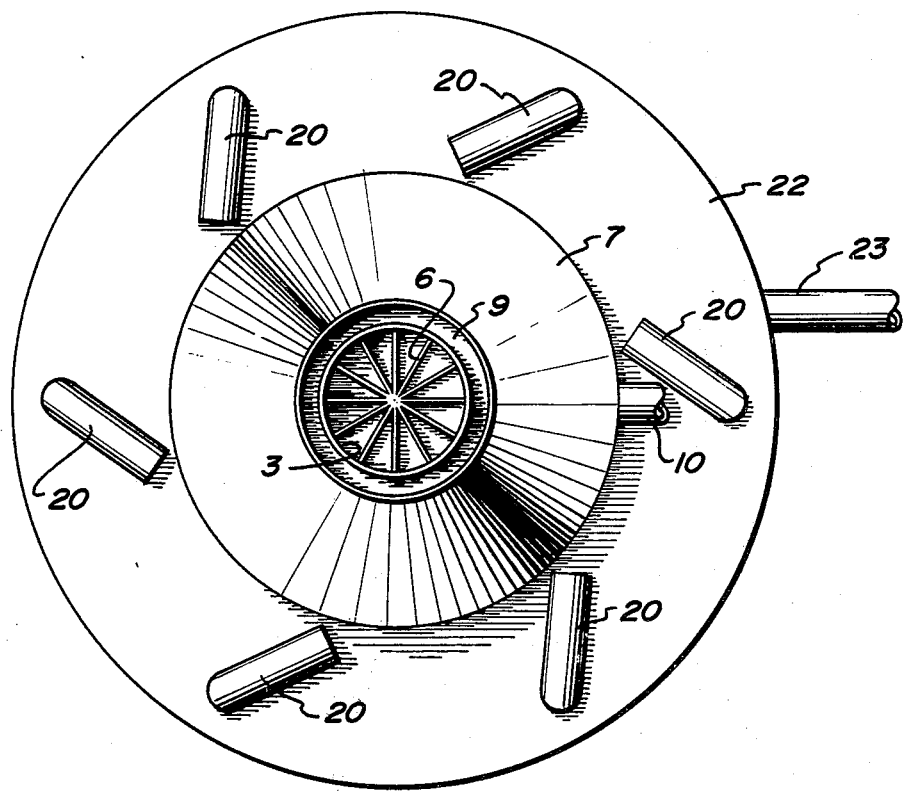
FIG. 2 is a schematic, diagrammatic, bottom view of the burner system of FIG. 1.
Figure 3:
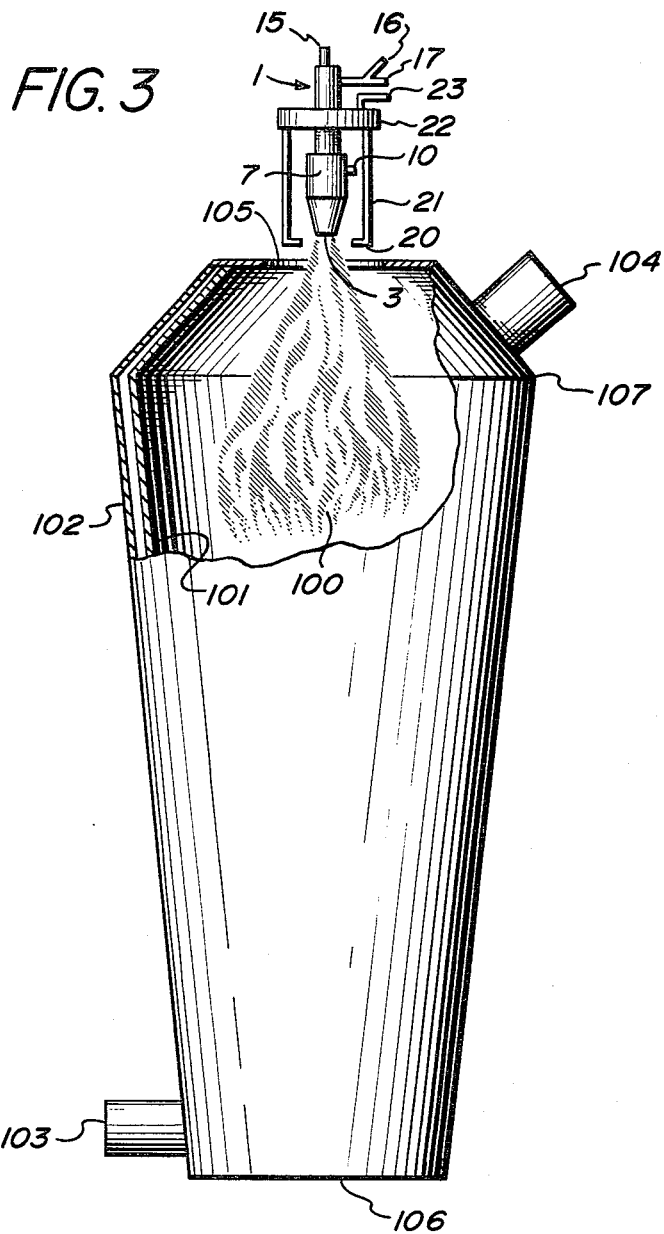
FIG. 3 is a schematic, diagrammatic, partially sectional side view showing the burner system of FIGS. 1 and 2 in conjunction with a suitable reaction chamber arrangement therefor.

A better understanding of the performance and workings of the invention can be had by reference to the drawing hereof wherein, in FIGS. 1 through 3, like reference numerals refer to like structures. Burner 1 comprises an inlet end 2 and a discharge end or mouth 3. The inlet end 2 defines a receiving and mixing chamber 4 wherein the gaseous or vaporous hydrolysis reactants are introduced and mixed. Thus, for instance, the hydrogen-containing water-producing fuel can be introduced through conduit 15, the metal or metalloid halide vapor or gas feedstock through conduit 16 and the oxygen-containing oxidant through conduit 17. As shown, the oxidant and metal or metalloid halide feedstock reactants can, if desired, be at least partially comingled in common conduit 18 prior to entry thereof into the mixing chamber 4 of burner 1. Due to the turbulent mixing of the gaseous reactants within the mixing chamber 4, it is desirable that a substantially linear mass flow of the resulting reactant mixture be established within the burner 1 prior to its discharge from the mouth 3 thereof. This can be conveniently achieved, for instance, by the presence of a plurality of stages 5 of flow rectifying baffles 6 arranged longitudinally in star-shaped patterns within the interior of the bore of the burner 1. The reactant mixture mass is then discharged from the mouth 3 of burner 1 and is preferably, but not necessarily, projected into a suitable enclosed reaction space 100 therefor.

Another essential element in the burner system of the invention comprises means to continuously discharge a purge gas along the boundary of the reactant mixture stream as the latter is discharged from the burner mouth 3. In the specific embodiment shown in the drawing hereof, said means comprises a plenum 7 affixed to the exterior of burner 1 and defining an annular space 8 therebetween. Plenum 7 extends downwardly over the exterior of burner 1 and narrows to define an annular slit 9 located in the region of and surrounding the burner mouth 3. Purge gas is introduced into the annular space 8 through conduit 10, flows downwardly through said space and is discharged through annular slit 9 along the boundary of the reactant mixture stream as the latter is discharged from the mouth 3 of burner 1. It will be understood, of course, that while the annular slit arrangement described above represents a preferred embodiment of the invention, the invention is not to be limited to the provision of an annular slit surrounding the burner mouth. For instance, a suitable alternative to the specific apparatus shown herein is that disclosed by Lee in U.S. Pat. No. 4,048,290 wherein a purge gas is transpired along the boundary of the discharging reactant mixture stream through porous diffusion means surrounding the burner mouth.

The burner system described thus far is broadly similar to those disclosed in U.S. Pat. Nos. 2,990,249; 3,954,945 or 4,048,290. These patents, however, do not contemplate the presence of plural continuous pilot flames stationed at a spaced distance downstream of the burner mouth and it is this pilot flame arrangement which represents a critical and essential component of the method and apparatus combinations of the present invention. Thus, the burner system of the present invention also comprises a plurality of pilot burner spuds 20 which spuds: (1) are arranged on a plane normal to the axis of the reactant mixture stream; (2) are arranged such as to project the pilot flames therefrom to a plane which is spaced downstream from the burner mouth 3; (3) surround the reactant mixture stream; and (4) are disposed to project pilot flames therefrom into substantially tangential contact with the periphery of the reactant mixture stream. In accordance with these general criteria it will be seen from the drawing that the burner spuds 20 are disposed such as to project their pilot flames to a plane which is spaced downstream from the plane of the burner mouth 3. This minimum spacing of the pilot flames at the points of contact thereof with the reactant mixture stream should normally be at least $\frac{1}{8}$ inch downstream from the plane of burner mouth 3 and the maximum of such spacing being at about that plane in the flow of the discharged reactant mixture stream at which the physical integrity of said stream begins to break down. Generally speaking, however, it has usually been found sufficient to arrange the burner spuds 20 on a plane such that the issuing pilot flames are directed to contact the reactant mixture stream at a plane spaced from about $\frac{1}{4}$ to about $\frac{1}{2}$ inch downstream from the burner mouth 3.

Also of importance, the pilot flame burner spuds 20 are disposed non-radially with respect to the centerline of the reactant mixture stream such that the pilot flames issuing therefrom contact said reactant mixture stream substantially only at the periphery thereof and in a substantially tangential manner. This is important since it assures that the flow of the reactant mixture mass will be disturbed little, if at all, by contact of the periphery thereof with the pilot flames.

As will be recognized by those of skill in the art, it is in the nature of things that the reactant mixture stream, as it is projected from the burner mouth 3, will tend to expand or "bloom." This expansion can be controlled, to some extent, by control of the purge gas flow within judicious limits, the minimum flow, of course, being that which avoids fouling of the burner mouth 3. In any event, the cross-sectional dimension of the reaction mixture stream as it courses through the plane defined by the burner spuds 20 should be taken into account and the spuds 20 spaced sufficiently from the periphery of said reaction mixture stream as to avoid physical contact therewith.

As mentioned previously, the burner spuds 20 are supplied with a fuel gas or, preferably, with a stably combustible mixture of fuel gas and oxidant. In this connection, this function can be readily achieved along with convenient mechanical fixation of the spuds 20 by the arrangement shown most clearly in FIG. 1. Therein, it will be noted, each spud 20 is supplied through a conduit 21 having its origin at a manifold 22 which is slidably affixed to the exterior of burner 1. When it is desired to alter the planar spacing of the pilot flames downstream from the mouth 3 of burner 1, it is only necessary to slide the manifold 22 up or down relative to the burner 1. Fuel gas or a combustible mixture of fuel gas and oxidant is supplied to the manifold 22 through conduit 23. If desired, of course, the fuel gas and the oxidant may be separately charged into the manifold 22 for admixture thereof and distribution of the resulting fuel/oxidant mixture to the burner spuds 20.

The number of burner spuds 20 employed is subject to considerable variation and will depend, in large measure, upon the cross-sectional dimension of the reactant mixture stream as it courses through the plane defined by the pilot flames. Desirably, substantially the entire periphery of the reactant mixture stream will be cloaked in pilot flames, thereby to avoid the formation of "dead spots" about the circumference of the reactant mixture stream. For instance, for a burner having a mouth 3 diameter of between about $1\frac{1}{2}$ and about $2\frac{1}{2}$ inches and whose burner spuds 20 are located on a plane spaced from $\frac{1}{4}$ to $\frac{1}{2}$ inch below the burner mouth 3, this desirable substantially complete cloaking of the periphery of the reactant mixture stream in pilot flames can generally be achieved when six pilot flames are utilized, employing six burner spuds 20 equiangularly spaced about the circumference of the reactant mixture stream. In the case of burner means 1 having mouth 3 diameters of substantially greater than about $2\frac{1}{2}$ inches, or in the case where the plane of the reactant mixture stream contacted by the pilot flames is located at a substantial distance below the burner mouth 3, the number of burner spuds 20 is desirably substantially greater, for example eight, ten, or even twelve.

The vertical angle of projection of the pilot flames from the burner spuds 20 (relative to the orientation of the apparatus shown in FIG. 1 or 3) is subject to considerable variation and will usually range from essentially cocurrent with respect to the flow of the reactant mixture stream to somewhat countercurrent thereto. Desirably, this angle, shown as angle $\alpha$ in FIG. 1, will be about normal to the longitudinal axis of the reactant mixture stream, the preferred range being between about 85° and 95° and the range of greatest preference being between about 90° and 94°. Where the angle of projection of the pilot flames lies substantially outside the broad limits set forth above there is usually developed a tendency of the pilot flames to course in a helical fashion about the circumference of the reactant mixture stream, thereby mitigating against the desired substantially complete cloaking of the periphery of the reactant stream with pilot flames and tending to create "dead spots" about the surface of the reactant mixture stream. If of sufficient magnitude, these dead spots can result in hydrolysis flame instabilities or in the tendency of the hydrolysis flame to snap back and periodically anchor on the burner mouth.

As can be appreciated from the above, the pilot flames of the invention serve to continuously initiate the hydrolysis flame reaction, to stabilize the hydrolysis flame and to define an anchoring point for the hydrolysis flame which is physically removed from the burner mouth 3. Thus, in accordance with the practice of the present invention, hydrolysis of the metal or metalloid halide feedstock is avoided in the region adjacent the burner mouth 3 and the burden of the purge gas flow to maintain a fouling-free environment about the burner mouth is thereby much reduced.

Having thus formed an initiated and stabilized hydrolysis reactant mixture flame, the reactant mixture mass is then provided with a salubrious environment within which the oxide-producing reaction can be brought to completion. Preferably, this environment is defined by an enclosed reaction space and, as shown in FIG. 3, the reactant mixture is projected from burner 1 into a suitably sized and enclosed reaction space 100. The reaction space 100 is defined by a reaction chamber 101 having a cooling jacket 102 annularly spaced about the exterior surface thereof. Cooling air is introduced unto the annular space of jacket 102 through conduit 103 and is exhausted through conduit 104. In the so-called "open-quench" system shown in FIG. 3, the reaction is cooled by air which is inducted through chamber inlet 105 and which cloaks the hydrolysis reaction flame and cools the reaction products therefrom to below the sintering temperature of the metal or metalloid oxide reaction product. The partially cooled reaction off-gases, containing the particulate oxide product entrained therein, are then withdrawn from reaction chamber 101 through outlet 106 and are subjected to the usual further cooling and solid product separation steps conventional in the art. The process economics of flame hydrolysis metal or metalloid oxide producing processes can often be beneficially affected by employing as the reaction quench process off-gases which have been cooled and from which at least most (e.g., greater than about 95%) of the particulate oxide product has been removed. While this specific embodiment is not explicitly disclosed in FIG. 3 hereof, it should be borne in mind that the only modifications of the FIG. 3 arrangement required to perform this off-gas quench scheme resides in the additional provision of a manifold sealingly interposed between the reaction chamber 101 and the burner 1 and a supply conduit to said manifold through which conduit cooled recycle off-gases are supplied to the manifold. The manifold, of course, opens into the reaction space 100.

There follow an illustrative, non-limiting example.

EXAMPLE

A burner system and reaction chamber of the general types shown in the drawing were employed having the following essential dimensions.

| Burner 1 | |
|---|---|
| Diameter of mouth 3 | 2.5 inches |
| Width of annular slit 9 | 0.005 inches |
| Pilot Flame Burner Spuds 20 | |
| Construction | 3/16 inch O.D. Steel |
| Number | 6 |
| Angle α | 92° |
| Spuds 20 oriented to tangentially contact pilot flames with periphery of reactant mixture stream. | |
| Plane of spuds 20 located about 1.5 inch downstream from burner mouth 3. | |
| Reaction Chamber 101 | |
| Length | 101.5 inches |
| I.D. at inlet 105 | 5.25 inches |
| I.D. at inlet 107 | 15.25 inches |
| Diameter inlet 105 | 7.75 inches |
| Cooling jacket 102 spaced from chamber 101 at a nominal spacing of about 2.5 inches | |
| Dial thermometer located at cooling air outlet 104. | |
| Burner system stationed coaxially above inlet 105, the pilot flame burner spuds 20 thereof being located about 2.375 inches above said inlet 105. | |

The specific starting materials employed in this example were as follows.

Feedstock—silicon tetrachloride preheated to about 325° F.
Hydrogen-containing fuel—dry hydrogen preheated to about 160° F.
Oxidant—dried air at about ambient temperature.
Purge gas—either air (Runs 2, 3) or hydrogen (Run 1) as noted in Table.
Pilot flame fuel—hydrogen.
Pilot flame oxidant—air.

A series of finely-divided silica-producing runs were made, throughout which runs cooling air was flowed through cooling jacket 102 by means of a blower operated as to maintain a substantially constant volume flow rate through inlet 103. At the start-up of each run the system was first placed on heat load in order to dry the apparatus and in order to bring it up to about operating temperature. The heat load cycle comprises operation of the pilot flames and burner 1, the latter being operated without supply of feedstock thereto. Switchover to the silica-producing run was then achieved by adjustment of the feed streams to the values stated in the Table appearing hereinafter. It should be noted that the control run, Run 1, was undertaken at what was considered to be the maximum capacity of the burner apparatus for the particular feedstock employed and goal silica product obtained.

The surface areas of the silica samples were determined in accordance with the well-known BET technique utilizing nitrogen isotherms. The BET (Brunauer-Emmet-Teller) method is completely described in an article appearing in the Journal of the American Chemical Society, Vol. 60, page 309 (1938).

The thickening efficiencies of the collected silica samples were determined by comparison of their individual thickening performances in a standard polyester resin liquid against that of one or the other of two standard flame hydrolysis silicas, CAB-O-SIL ® fumed silica M-5, a silica produced by Cabot Corporation, Boston, Ma., having a BET-$N_2$ surface area of 200±25 $m^2/g$ or CAB-O-SIL PTG, a silica having a BET $N_2$ surface area of 220 $m^2/g$ ±15. In this test, six and one-half grams of the silica standard and the silica under test were each dispersed in separate 394 gram batches of an unpromoted polyester resin, Polylite 31007, Reichhold Chemicals, Inc., White Plains, N.Y. The dispersion was carried out in a Premier Dispersator, Premier Mill Corporation, New York, N.Y. for a period of 5 minutes and at a shaft speed of 3000 r.p.m. The resulting silica/polyester samples were then transferred into separate glass jars which were capped and placed in a constant temperature water bath for a period of about 4 hours, the bath being maintained at a temperature of 77° F. Next, the silica/polyester samples were subjected to viscometric analyses by means of a Brookfield Model LVT Viscometer, Brookfield Engineering Laboratories, Inc., Stoughton, Ma. The thickening efficiency of the test silica was then expressed as follows:

Thickening Efficiency (%) =
$$\frac{\text{Test silica/polyester resin (cps)}}{\text{Standard silica/polyester viscosity (cps)}} \times 100$$

During the course of each of the runs accomplished in accordance with the present invention, Runs 2 and 3, the hydrolysis flame was periodically visually inspected and, in each instance, it was noted that said flame was of smooth stable geometry and was firmly anchored at a point physically removed from the burner mouth 3 by the continuous pilot flames. Upon completion of each of the runs in accordance with the invention, the burner was inspected and the mouth 3 thereof was found to have only a light and negligible dusting of silica product thereon.

TABLE

| Process Feed Rate | Control Run 1 | Invention Run 2 | Invention Run 3 |
|---|---|---|---|
| Burner 1 | | | |
| SiCl$_4$ (lbs/hr) | 375 | 375 | 500 |
| H$_2$ (scfh) | 2735 | 1995 | 2660 |
| Air (scfh) | 11196 | 7125 | 9500 |
| Annular Slit 9 | | | |
| H$_2$ (scfh) | 240 | 0 | 0 |
| Air (scfh) | 0 | 165 | 165 |
| Pilot Flame Burner-Spuds 20 | | | |
| H$_2$ (scfh) (total) | 0 | 44 | 44 |
| Air (scfh) (total) | 0 | 30 | 30 |
| Cooling air temperature at outlet 104 (°F.) | 250 | 165 | 230 |
| Total H$_2$ (scfh) | 2975 | 2039 | 2704 |
| Total Air (scfh) | 11196 | 7320 | 9695 |
| Silica Product | | | |
| BET-N$_2$ Surface Area (m$^2$/g) | 422 | 400 | 404 |
| Thickening Efficiency | | | |
| % M-5 | 166 | 182 | 152 |
| % PTG | — | — | — |

Referring now to the Table, it is apparent therefrom that for a given goal silica product and a fixed throughput of feedstock through a given burner apparatus, the practice of the present invention provides for substantial reductions in consumption of both hydrogen-containing fuel and oxidant. In turn, there also results a substantial reduction in heat released per weight unit of product oxide. In this connection, for instance, comparison is made between Control Run 1 and Invention Run 2. These reduced fuel and oxidant rates obviously represent substantial operating economies and, moreover, can also be reasonably expected to result in lower operating costs, reduced upkeep and longer service life of equipment. Moreover, these experienced reductions appeared to give cause to believe that the rated capacity of the burner apparatus, when operated under conventional conditions, might no longer be valid when operated in accordance with the invention. Accordingly, Invention Run 3 was made in order to explore a feedstock throughput rate which was substantially in excess of the rated burner capacity for the particular feedstock employed and for the given goal silica product when produced under conventional operating conditions. As will be noted, Invention Run 3 successfully produced the goal silica product at an increase in throughput of about 33% over Control Run 1. Moreover, despite this improved feedstock rate, the overcapacity run of Run 3 utilized less total hydrogen-containing fuel than their corresponding control run of Run 1 and did not result in a cooling air temperature exceeding that of the control run.

Further benefits resulting from the practice of the invention are seen to reside in reduced off-gas volume: oxide product ratios, which reduced ratios serve to reduce the off-gas handling burden on equipment downstream of outlet 106 such as cooling, handling and collection equipment. Moreover, as a further corollary to such reduced ratios, a higher concentration of hydrogen halide is experienced in the reaction off-gas composition, thereby reducing the gas handling burden on downstream recovery components adapted to recover the valuable hydrogen halide by-product of the reaction.

While this invention has been described in the foregoing specification in connection with certain preferred embodiments thereof, obviously many additional variations and modifications will suggest themselves to those skilled in the art. Thus, it is to be understood that the foregoing specification, taken in conjunction with the drawing, is intended to be illustrative in nature and that the scope of the invention is to be circumscribed only by the scope of the claims appended hereto.

The embodiments of the invention in which an exclusive property or privilege is claimed are defined as follows:

1. In a process for the production of finely-divided particulate metal and metalloid oxides comprising mixing, within a burner means, a vaporous or gaseous metal or metalloid halide, or mixture thereof, with a hydrogen-containing water-producing fuel and an oxidant therefor; projecting the resulting reactant mixture as a continuous stream from the mouth of said burner means into a reaction space; continuously discharging a purge gas at a fouling preventive rate along the boundary of said reactant mixture stream in the region of the burner mouth and continuously combusting the reactant mixture stream within said reaction space to produce said finely-divided particulate oxide therein; the improvement which comprises: substantially tangentially contacting the periphery of said reactant mixture stream, at a plane substantially normal thereto and spaced downstream from said burner mouth, with a plurality of continuous pilot flames.

2. The process of claim 1 wherein said purge gas is air.

3. The process of claim 1 wherein said purge gas is hydrogen.

4. The process of claim 1 wherein said fuel is hydrogen.

5. The process of claim 1 wherein said metal or metalloid halide comprises silicon tetrachloride.

6. The process of claim 1 wherein said plane is located at between about ¼ and about ¾ inch downstream of said burner mouth.

7. The process of claim 1 wherein the fuel employed for performance of said pilot flames is of similar type to that employed in the performance of said reactant mixture stream.

8. The process of claim 1 wherein the fuel employed for performance of said pilot flames is hydrogen.

9. The process of claim 1 wherein said pilot flames are supplied with a combustible fuel/oxidant premixture.

10. The process of claim 1 wherein the angle of said pilot flames with respect to the longitudinal axis of said reactant mixture stream, is about normal thereto.

11. The process of claim 10 wherein said angle is between about 85° and about 95°.

12. The process of claim 11 wherein said angle is between about 90° and about 94°.

13. The process of claim 1 wherein the number of said pilot flames is sufficient to substantially completely cloak the periphery of said reactant mixture stream.

* * * * *